United States Patent
Kuratani

(10) Patent No.: US 12,019,774 B2
(45) Date of Patent: Jun. 25, 2024

(54) EXCLUSIVE CONTROL SYSTEM AND EXCLUSIVE CONTROL METHOD

(71) Applicant: MURATA MACHINERY, LTD., Kyoto (JP)

(72) Inventor: Yasuhiro Kuratani, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 802 days.

(21) Appl. No.: 17/047,719

(22) PCT Filed: Mar. 14, 2019

(86) PCT No.: PCT/JP2019/010654
§ 371 (c)(1),
(2) Date: Oct. 15, 2020

(87) PCT Pub. No.: WO2019/202888
PCT Pub. Date: Oct. 24, 2019

(65) Prior Publication Data
US 2021/0110053 A1   Apr. 15, 2021

(30) Foreign Application Priority Data

Apr. 19, 2018   (JP) .................................. 2018-080698

(51) Int. Cl.
*G06F 21/62* (2013.01)
*G06F 8/65* (2018.01)
*G06F 9/52* (2006.01)

(52) U.S. Cl.
CPC ............ *G06F 21/6218* (2013.01); *G06F 8/65* (2013.01); *G06F 9/526* (2013.01); *G06F 2221/2141* (2013.01)

(58) Field of Classification Search
CPC ......... G06F 2221/2141; G06F 21/6218; G06F 8/65; G06F 9/526
(Continued)

(56) References Cited

U.S. PATENT DOCUMENTS 5,832,510 A * 11/1998 Ito ........................... G06F 16/10
                                                           707/610
5,867,655 A *  2/1999 DeRoo ................ G06F 9/30101
                                                           709/213
(Continued)

FOREIGN PATENT DOCUMENTS

JP    06-103142 A    4/1994
JP    07-325747 A   12/1995
(Continued)

OTHER PUBLICATIONS

Official Communication issued in corresponding European Patent Application No. 19787950.5, mailed on Dec. 7, 2021.
(Continued)

*Primary Examiner* — Hanh B Thai
(74) *Attorney, Agent, or Firm* — Keating & Bennett, LLP

(57) ABSTRACT

Each of a plurality of terminals includes a process executor to set on a server an access right to define an exclusion period during which a first terminal can access a specific file while access thereto by a second terminal is restricted, and to execute an updating process to update the exclusion period before the exclusion period lapses; and a determiner to determine access to the specific file as being restricted if within the exclusion period defined by a second terminal, and to determine access to the specific file as being not restricted if outside the exclusion period.

4 Claims, 9 Drawing Sheets

(58) Field of Classification Search
USPC .......................................................... 709/231
See application file for complete search history.

(56) References Cited

U.S. PATENT DOCUMENTS

| | | | | |
|---|---|---|---|---|
| 5,892,904 | A * | 4/1999 | Atkinson | G06F 21/64 |
| | | | | 713/170 |
| 5,930,772 | A * | 7/1999 | Gomyo | H04L 67/14 |
| | | | | 707/999.009 |
| 6,122,631 | A * | 9/2000 | Berbec | G06F 21/6218 |
| | | | | 707/999.009 |
| 6,311,255 | B1 * | 10/2001 | Sadana | G06F 11/073 |
| | | | | 711/149 |
| 6,952,755 | B2 * | 10/2005 | Karube | G06F 9/52 |
| | | | | 711/147 |
| 7,155,524 | B1 * | 12/2006 | Reiter | G06F 9/526 |
| | | | | 709/229 |
| 7,260,555 | B2 * | 8/2007 | Rossmann | H04L 63/105 |
| | | | | 705/50 |
| 7,587,749 | B2 * | 9/2009 | Leser | H04L 9/0891 |
| | | | | 709/229 |
| 8,214,193 | B2 * | 7/2012 | Chawla | H04L 41/0895 |
| | | | | 703/22 |
| 8,387,122 | B2 * | 2/2013 | Toomim | G06F 21/6218 |
| | | | | 726/5 |
| 8,494,157 | B2 * | 7/2013 | Takashima | G11B 20/00528 |
| | | | | 713/193 |
| 8,763,145 | B2 * | 6/2014 | Mihara | G06F 21/6218 |
| | | | | 726/26 |
| 8,966,374 | B1 * | 2/2015 | Hardebeck | G06Q 10/10 |
| | | | | 715/740 |
| 9,264,480 | B1 * | 2/2016 | Saylor | H04L 67/06 |
| 9,628,268 | B2 * | 4/2017 | Kiang | G06F 21/6218 |
| 9,632,842 | B2 * | 4/2017 | Suzuki | G06F 9/526 |
| 10,924,931 | B2 * | 2/2021 | Shahine | G06F 21/606 |
| 10,944,752 | B2 * | 3/2021 | Lopez-Uricoechea | G06F 21/6218 |
| 11,550,942 | B2 * | 1/2023 | Hamilton | G06F 21/31 |
| 2003/0005135 | A1 * | 1/2003 | Inoue | H04N 21/2541 |
| | | | | 348/E7.071 |
| 2003/0112977 | A1 * | 6/2003 | Ray | H04L 9/321 |
| | | | | 380/270 |
| 2003/0204597 | A1 * | 10/2003 | Arakawa | G06F 3/0659 |
| | | | | 709/219 |
| 2004/0117358 | A1 * | 6/2004 | von Kaenel | G06Q 40/08 |
| 2004/0210532 | A1 * | 10/2004 | Nagawa | G06F 21/6218 |
| | | | | 705/51 |
| 2005/0289512 | A1 | 12/2005 | Matsusaka | |
| 2006/0161539 | A1 * | 7/2006 | Narita | G06F 16/27 |
| 2006/0161750 | A1 * | 7/2006 | Perkins | H04L 9/321 |
| | | | | 711/164 |
| 2006/0259471 | A1 * | 11/2006 | Droubie | G06Q 99/00 |
| 2007/0106668 | A1 * | 5/2007 | Maegawa | G06F 21/34 |
| | | | | 707/999.009 |
| 2007/0124342 | A1 * | 5/2007 | Yamamoto | G06F 9/466 |
| 2008/0033955 | A1 * | 2/2008 | Fujii | G06F 21/6218 |
| | | | | 707/999.009 |
| 2008/0243854 | A1 * | 10/2008 | Noguchi | G06F 21/6218 |
| | | | | 707/999.009 |
| 2008/0281716 | A1 * | 11/2008 | Nagoya | H04L 63/0236 |
| | | | | 705/26.1 |
| 2009/0119395 | A1 * | 5/2009 | Kodama | G06F 16/252 |
| | | | | 709/223 |
| 2009/0198704 | A1 * | 8/2009 | Landberg | G06F 16/13 |
| 2009/0205017 | A1 * | 8/2009 | Yabe | G06F 21/6209 |
| | | | | 726/1 |
| 2009/0307745 | A1 * | 12/2009 | Inose | G06Q 10/06 |
| | | | | 726/1 |
| 2012/0030242 | A1 * | 2/2012 | Nakamura | G06F 21/6218 |
| | | | | 707/E17.032 |
| 2012/0066179 | A1 * | 3/2012 | Saika | G06F 3/067 |
| | | | | 707/634 |
| 2012/0166587 | A1 * | 6/2012 | Schilders | H04L 9/40 |
| | | | | 709/217 |
| 2012/0179821 | A1 * | 7/2012 | Heidenreich | G06F 9/526 |
| | | | | 709/225 |
| 2012/0191681 | A1 * | 7/2012 | Yamamoto | G06F 11/1474 |
| | | | | 707/703 |
| 2012/0324544 | A1 * | 12/2012 | Kanetomo | H04L 12/6418 |
| | | | | 726/4 |
| 2013/0007891 | A1 * | 1/2013 | Mogaki | G06F 21/6218 |
| | | | | 726/27 |
| 2014/0005805 | A1 * | 1/2014 | Nishiyama | G05B 19/05 |
| | | | | 700/74 |
| 2014/0012922 | A1 * | 1/2014 | Wu | G06F 16/972 |
| | | | | 709/205 |
| 2014/0026143 | A1 * | 1/2014 | Suzuki | G06F 9/52 |
| | | | | 718/104 |
| 2014/0157432 | A1 * | 6/2014 | Honzumi | H04L 63/10 |
| | | | | 726/27 |
| 2014/0325174 | A1 * | 10/2014 | Goto | G06F 21/445 |
| | | | | 711/163 |
| 2015/0161412 | A1 * | 6/2015 | Price | G06F 16/13 |
| | | | | 707/609 |
| 2015/0173002 | A1 * | 6/2015 | Nakagawa | H04W 48/16 |
| | | | | 455/435.2 |
| 2015/0248565 | A1 * | 9/2015 | Onodera | H04M 3/42348 |
| | | | | 726/1 |
| 2015/0358428 | A1 * | 12/2015 | Kobayashi | G06F 11/1443 |
| | | | | 709/203 |
| 2016/0014118 | A1 * | 1/2016 | Da | H04L 63/10 |
| | | | | 726/4 |
| 2016/0080068 | A1 * | 3/2016 | Ishihara | H04L 67/1095 |
| | | | | 455/7 |
| 2016/0134555 | A1 * | 5/2016 | Dymond | G06F 21/6218 |
| | | | | 709/226 |
| 2016/0164878 | A1 * | 6/2016 | Nakano | G06F 21/10 |
| | | | | 726/4 |
| 2016/0211944 | A1 * | 7/2016 | Kenney | H04L 5/0035 |
| 2016/0323807 | A1 * | 11/2016 | Ghosh | H04W 74/0833 |
| 2018/0063398 | A1 * | 3/2018 | Tajiri | H04N 23/661 |
| 2019/0143999 | A1 * | 5/2019 | Tsukidate | G06F 9/52 |
| | | | | 701/29.2 |
| 2020/0351323 | A1 * | 11/2020 | Gong | G06F 16/176 |
| 2021/0004491 | A1 * | 1/2021 | Saha | H04W 12/03 |
| 2021/0266346 | A1 * | 8/2021 | Gordon | H04L 63/0245 |
| 2022/0179643 | A1 * | 6/2022 | Harata | G06F 8/65 |

FOREIGN PATENT DOCUMENTS

| | | |
|---|---|---|
| JP | 2005-100207 A | 4/2005 |
| JP | 2012-058960 A | 3/2012 |
| WO | 2012/032873 A1 | 3/2012 |

OTHER PUBLICATIONS

Official Communication issued in International Patent Application No. PCT/JP2019/010654, mailed on Apr. 9, 2019.

* cited by examiner

EXCLUSIVE CONTROL SYSTEM AND EXCLUSIVE CONTROL METHOD

BACKGROUND OF THE INVENTION

1. Field of the Invention

The present invention relates to an exclusive control system and an exclusive control method.

2. Description of the Related Art

In those cases where a file is processed on a server by a plurality of terminals (clients) connected on a network, in order to prevent a flaw caused by the plurality of terminals separately performing processing on one file, exclusive control is performed so that when one terminal is performing processing, other terminals are prohibited to perform processing. Japanese Unexamined Patent Application No. H06-103142 discloses a configuration such that exclusive control is realized by monitoring on the server side whether or not a terminal is connected to a file.

In the system disclosed in Japanese Unexamined Patent Application No. H06-103142 requires a server-side operation (monitoring) is required for exclusive control of a specific file, however, there are cases where a program for a server to perform such an operation cannot be applied to the server.

SUMMARY OF THE INVENTION

Preferred embodiments of the present invention provide exclusive control systems and exclusive control methods that are each able to provide exclusive control which is completed entirely by terminal side operations.

An exclusive control system according to a preferred embodiment of the present invention includes a plurality of terminals and a server having predetermined data which is able to be accessed by each of the plurality of terminals, the exclusive control system restricting simultaneous access from the plurality of terminals to the predetermined data. Each of the plurality of terminals includes a process executor and a determiner. The process executor sets on the server an access right to define an exclusion period during which a first terminal is able to access the predetermined data while access of a second terminal to the predetermined data is restricted. If a predetermined timing before a lapse of the exclusion period has occurred during access of the first terminal to the predetermined data, the process executor repeatedly executes an updating process to update the exclusion period before the exclusion period lapses. The determiner determines access to the predetermined data as being restricted if within the exclusion period defined by a second terminal, and determines access to the predetermined data as being not restricted if outside the exclusion period.

The process executor may, when accessing the predetermined data, create on the server an authentication file having a valid period which is the exclusion period and, if the predetermined timing before lapse of the valid period has occurred during access of the first terminal to the predetermined data, may repeatedly execute an updating process to update the authentication file. The determiner may determine access to the predetermined data as being restricted if the authentication file created on the server by a second terminal is within the valid period, and may determine access to the predetermined data as being not restricted if the authentication file created by a second terminal is not present on the server or if the valid period of the authentication file created on the server by a second terminal has elapsed.

The server may have a file in which, as the predetermined data, there is recorded map data indicating a track to transport an article by a transport vehicle and a delivery destination of the article.

An exclusive control method according to a preferred embodiment of the present invention includes a plurality of terminals and a server having predetermined data which is able to be accessed by each of the plurality of terminals, the exclusive control method restricting simultaneous access from the plurality of terminals to the predetermined data. Each of the plurality of terminals performs a step of setting on the server an access right to define an exclusion period during which a first terminal is able to access the predetermined data while access of a second terminal to the predetermined data is restricted and, if a predetermined timing before lapse of the exclusion period has occurred during access of the first terminal to the predetermined data, repeatedly executing an updating process to update the exclusion period before the exclusion period lapses. Each of the plurality of terminals also performs a step of determining access to the predetermined data as being restricted if within the exclusion period defined by a second terminal, and determining access to the predetermined data as being not restricted if outside the exclusion period.

According to the exclusive control systems and the exclusive control methods according to the preferred embodiments of the present invention, the process executor included in each of the plurality of terminals sets on the server an access right to define an exclusion period during which a first terminal is able to access the predetermined data while access of a second terminal to the predetermined data is restricted, and, if a predetermined timing before lapse of the exclusion period has occurred during access of the own terminal to the predetermined data, repeatedly executes an updating process to update the exclusion period before the exclusion period lapses. Meanwhile, the determiner determines access to the predetermined data as being restricted if within the exclusion period defined by a second terminal and determines access to the predetermined data as being not restricted if outside the exclusion period. Therefore, exclusive control which is completed entirely by terminal side operations is able to be provided. Accordingly, no exclusive control program is required for the server, and a load on the server is able to be reduced.

In a preferred embodiment of the present invention in which the process executor, when accessing the predetermined data, creates on the server an authentication file having a valid period which is an exclusion period and, if the predetermined timing before lapse of the valid period has occurred during access of the first terminal to the predetermined data, repeatedly executes an updating process to update the authentication file, and the determiner determines access to the predetermined data as being restricted if the authentication file created on the server by a second terminal is within the valid period and determines access to the predetermined data as being not restricted if the authentication file created by a second terminal is not present on the server or if the valid period of the authentication file created on the server by a second terminal has elapsed, simultaneous access from a large number of terminals to predetermined data is able to be restricted, by performing simple operations including creating and updating an authentication file.

In a preferred embodiment of the present invention in which the server has a file in which, as the predetermined data, there is recorded map data indicating a track to transport an article by a transport vehicle and a delivery destination of the article, in a transport vehicle system for transporting articles by transport vehicles, simultaneous access to the predetermined data in which the map data is recorded is able to be restricted.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
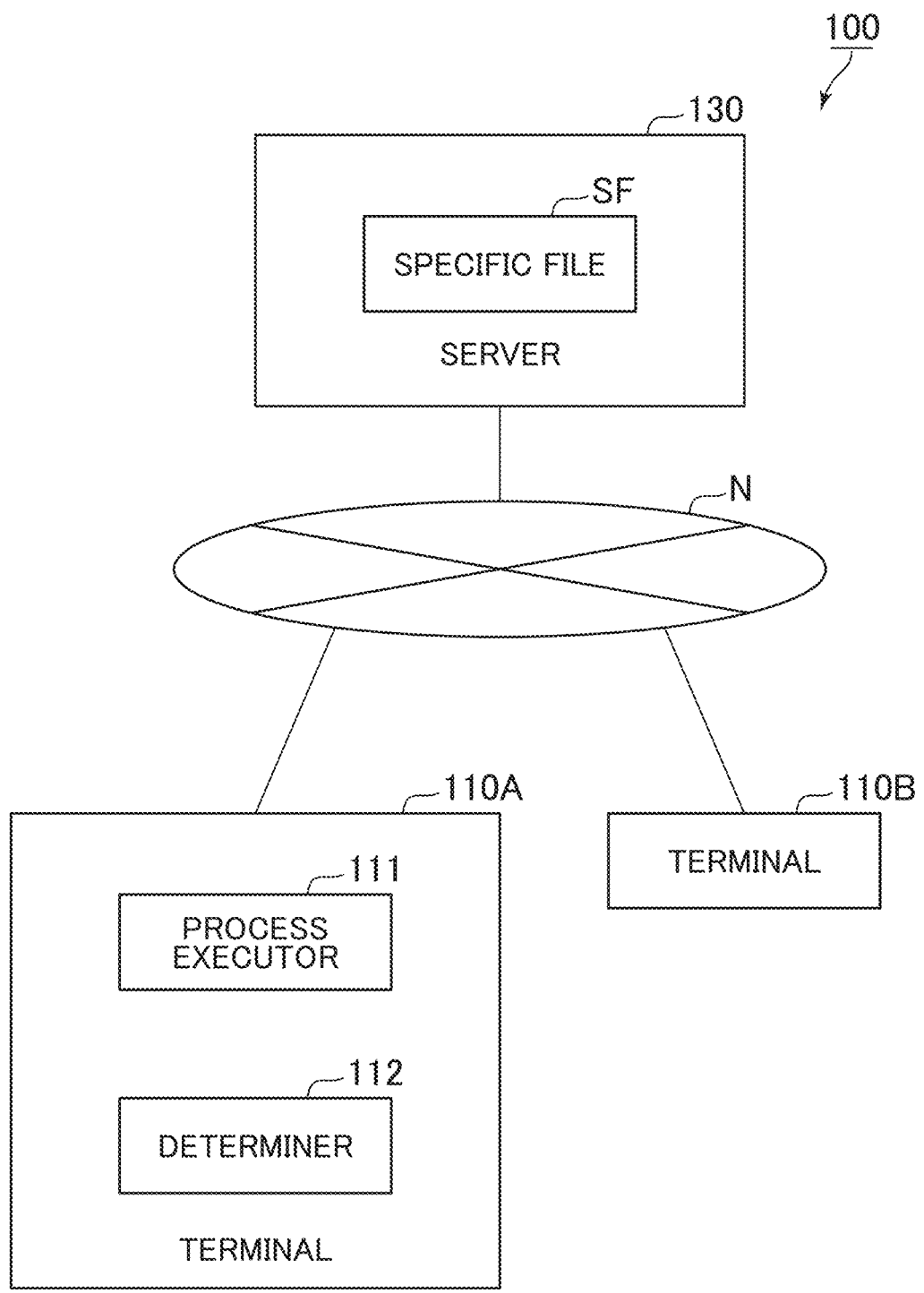
FIG. 1 is a diagram showing an example of an exclusive control system according to a preferred embodiment of the present invention.

The following describes preferred embodiments of the present invention, with reference to the drawings. However, the present invention is not limited to the preferred embodiments. FIG. 1 shows an example of an exclusive control system 100. As shown in FIG. 1, the exclusive control system 100 includes: a plurality of terminals (clients) 110A, 110B (hereinafter, may be referred to as terminals 110 or terminals A, B); and a server 130 having a specific file (predetermined data) SF which is able to be accessed by each of the plurality of terminals 110. Other than a specific file SF, the predetermined data may be a database provided in a server 130 or may be application software. The exclusive control system 100 is a system which restricts simultaneous access from the plurality of terminals 110 to the specific file SF. In the present preferred embodiment, restricting simultaneous access includes: prohibiting editing of the specific file SF while permitting acquisition and viewing thereof; prohibiting editing and acquisition of the specific file SF while permitting viewing thereof; prohibiting editing, acquisition, and viewing of the specific file SF; and the like.

The plurality of terminals 110 are each communicatively connected to the server 130 via a line N. The line N includes a computer network, for example, the Internet, a core network of a telecommunications carrier, and various types of local networks. The plurality of terminals 110 may be desktop type or notebook type personal computers, or may be mobile terminals, for example, tablets or smartphones.

The plurality of terminals 110 can be connected to the server 130, and a single server 130 may be included or the server 130 may be defined by a collection of a plurality of servers. The specific file SF is stored in a memory storage region which is a portion of the server 130. The plurality of terminals 110 can access the specific file SF after connecting to the server 130. The specific file SF has a file in which map data of a transport vehicle system is recorded, for example. The transport vehicle system is, for example, an article transport system installed in a semiconductor device manufacturing factory, and transports, as articles, containers, for example, FOUPs (Front Opening Unified Pods) accommodating semiconductor wafers used during manufacturing semiconductor devices, and reticle pods accommodating processing members, for example, reticles. The map data of a transport vehicle system is data indicating tracks to transport articles by transport vehicles and delivery destinations of the articles.

Figure 2:
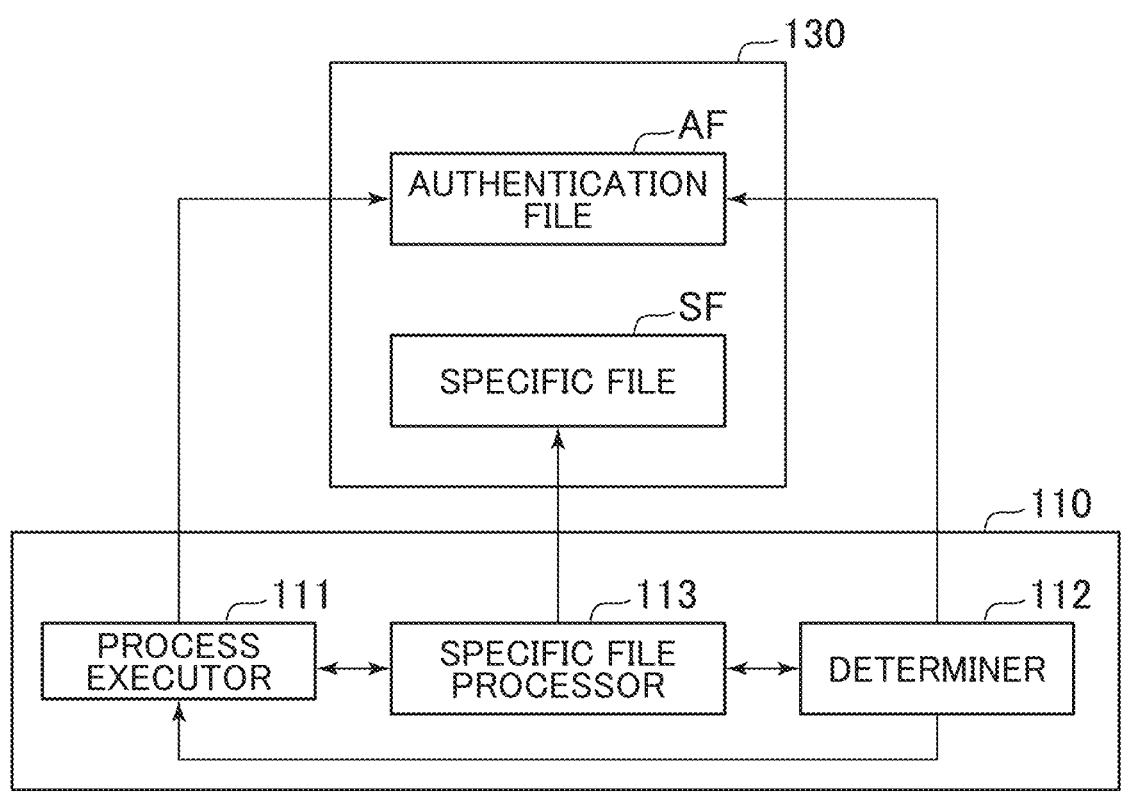
FIG. 2 is a diagram showing an example of a functional block configuration of a terminal.

FIG. 2 shows an example of the terminal 110. As shown in FIG. 2, the terminal 110 includes a process executor 111, a determiner 112, and a specific file processor 113. The process executor 111 sets on the server 130 an access right to define an exclusion period S during which a first terminal is able to access the specific file SF while access of a second terminal to the specific file SF which is being accessed by (or being accessible to) the first terminal is restricted, and executes an updating process to update the exclusion period S before the exclusion period S lapses.

The process executor 111 creates on the server 130, when accessing the specific file SF on the server 130, an authentication file AF having a valid period. Creation of this authentication file AF is similar to setting an access right to define an exclusion period S in the server 130. That is, the state of a terminal 110 having an access right is a state where a valid (within a valid period) authentication file AF created by the terminal 110 is present on the server 130. In the authentication file AF, identification information (for example, an IP address) of the terminal 110 which created the authentication file and a valid period are defined. For example, the start time of the valid period and a period of validity (a duration of time) from the start time are defined. During the valid period, the authentication file AF is valid. That is, the valid period of an authentication file AF sets an exclusion period S. When the valid period lapses (when the valid period expires), the authentication file AF becomes invalid, and other terminals 110 can access the specific file SF even if that authentication file AF is still present. An authentication file AF is a file which records data necessary to allow the first terminal to access the specific file SF during a valid period and restricting access to the specific file SF from other terminals during the valid period. The valid period of the specific file SF corresponds to the predetermined exclusion period S. The process executor 111 of the terminal 110 accessing (or capable of accessing) the specific file SF on the server 130 updates the authentication file AF on the server 130 before the valid period of the authentication file AF lapses. As described herein, the term "update" refers to both creating and overwriting with a new authentication file AF. The process executor 111 deletes the authentication file AF on the server 130 when terminating access to the specific file SF.

When updating the authentication file AF, if a valid period (an exclusion period S) is set preliminarily, the process executor 111 may update time data related to the start time of the valid period, in the data recorded in the authentication file AF. The time data may be data which specifies the start time of the updated valid period and may be data which explicitly indicates the updated start time, or may be data which provides information to calculate the start time, by indicating the period of time elapsed from a given reference time.

When updating the authentication file AF, the process executor 111 may update, of the data recorded in the authentication file AF, period data related to the valid period (the exclusion period S). The period data may be data which specifies the updated valid period. The period data may be data which explicitly indicates the valid period or may be data which provides information to calculate the exclusion period S, by indicating how many times the length of a given period the length of the valid period is.

The determiner 112 determines access to the specific file SF as being restricted (as being not to be accessed) if a valid authentication file AF (an authentication file AF within a valid period) which is an authentication file AF created by a second terminal corresponding to another terminal 110 (an authentication file AF in which identification information of another terminal 110 is defined) is present on the server 130. If there is no authentication file AF created by another terminal 110 is present on the server 130 or if an authentication file AF created on the server 130 by another terminal 110 is not valid (the valid period thereof has elapsed), the determiner 112 determines access to the specific file SF as being not restricted (access thereto as being permitted). That is, the determiner 112 determines whether or not the specific file SF is able to be accessed according to whether or not a valid authentication file AF created by another terminal 110 is present on the server 130. If another terminal 110 abnormally terminates while accessing the server 130, the valid period of the authentication file AF lapses and the authentication file AF becomes invalid, and thereafter, the specific file SF is able to be accessed even if the authentication file AF, the valid period of which has elapsed, still remains on the server 130 (is present on the server 130).

If the valid period of the authentication file AF is set preliminarily, the determiner 112 may determine whether or not the authentication file AF is within the valid period, based on start time data of the valid period of the authentication file AF. The determiner 112 may determine whether or not the present point in time is within the valid period by calculating the valid period from the start time data. The determiner 112 may determine whether or not the authentication file AF is within the valid period, based on updated period data (for example, one hour). The determiner 112 may determine viewing of the specific file SF as being restricted if any one of the other terminals is accessing (or is allowed to access) the specific file SF. The determiner 112 may determine acquisition of the specific file SF as being restricted if any one of the other terminals is accessing (or is allowed to access) the specific file SF. The determiner 112 may determine editing of the specific file SF as being restricted if any one of the other terminals is accessing (or is allowed to access) the specific file SF.

If access to the specific file SF is not restricted, the specific file processor 113 accesses the specific file SF based on an input of the user who instructs to access the specific file SF. If viewing of the specific file SF is not restricted, the specific file processor 113 performs processing of viewing the specific file SF based on an input of the user who instructs to view the specific file SF. If acquisition of the specific file SF is not restricted, the specific file processor 113 performs processing of acquiring the specific file SF based on an input of the user who instructs to acquire the specific file SF. If editing of the specific file SF is not restricted, the specific file processor 113 performs processing of editing the specific file SF based on an input of the user who instructs to edit the specific file SF.

As described above, whether or not the terminals 110 can access the specific file SF is determined by the determiner 112 of each terminal 110. While any of the terminals 110 is accessing the specific file SF or is allowed to access the specific file SF, the presence of the authentication file AF created (updated) by the process executor 111 on the server 130 prevents the specific file SF from being accessed by the determiner 112 of another terminal 110. That is, the exclusive control for the specific file SF is completed by processing of the terminal 110. Accordingly, the server 130 only needs to have a region to store the authentication file AF and does not require an exclusive control program stored on the server 130. Therefore, even a server or the like which is unable to have an exclusive control program is able to perform the exclusive control on the specific file SF.

Figure 3:
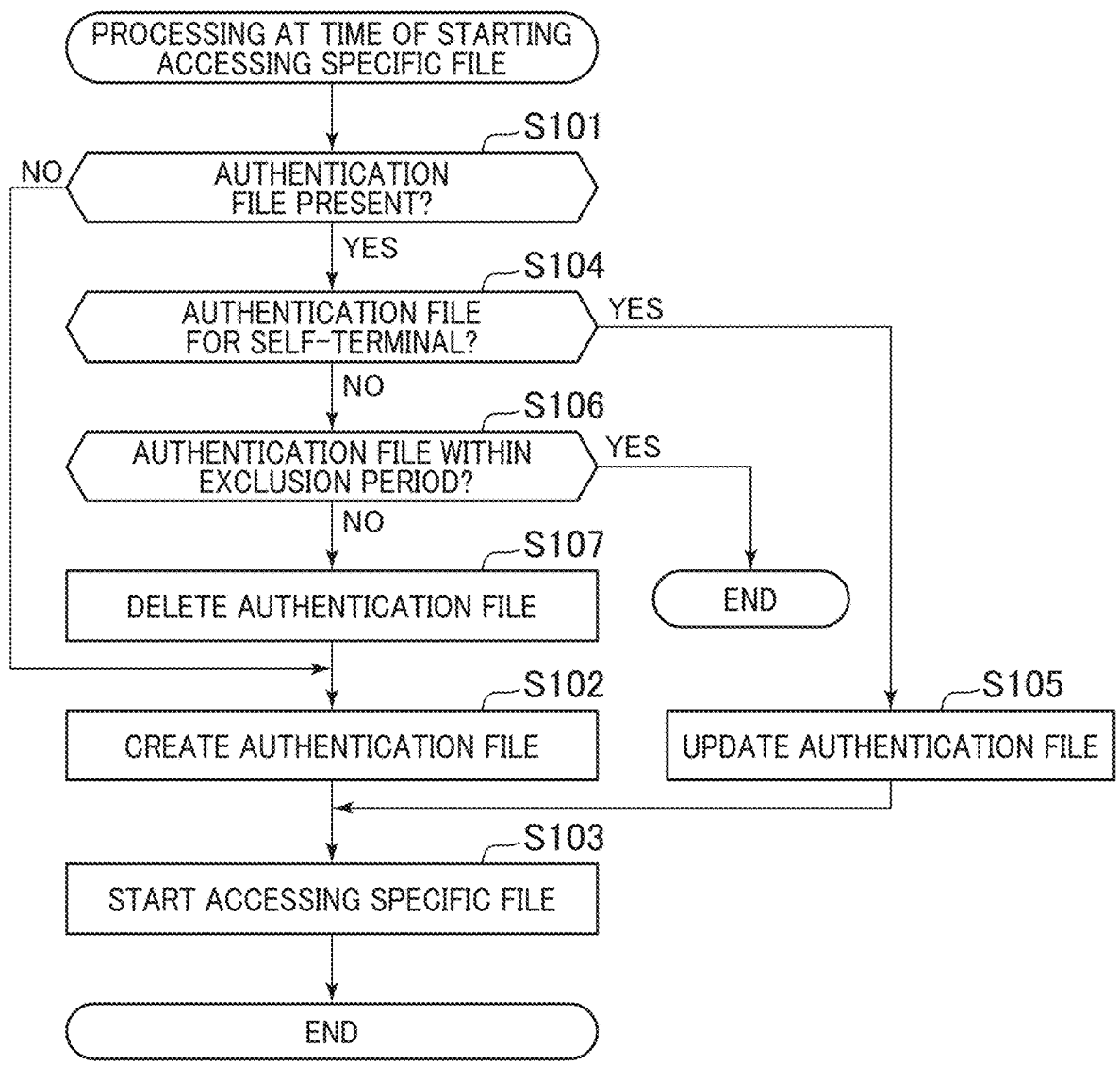
FIG. 3 is a diagram showing an example of an operation flow of the terminal.
Figure 4:
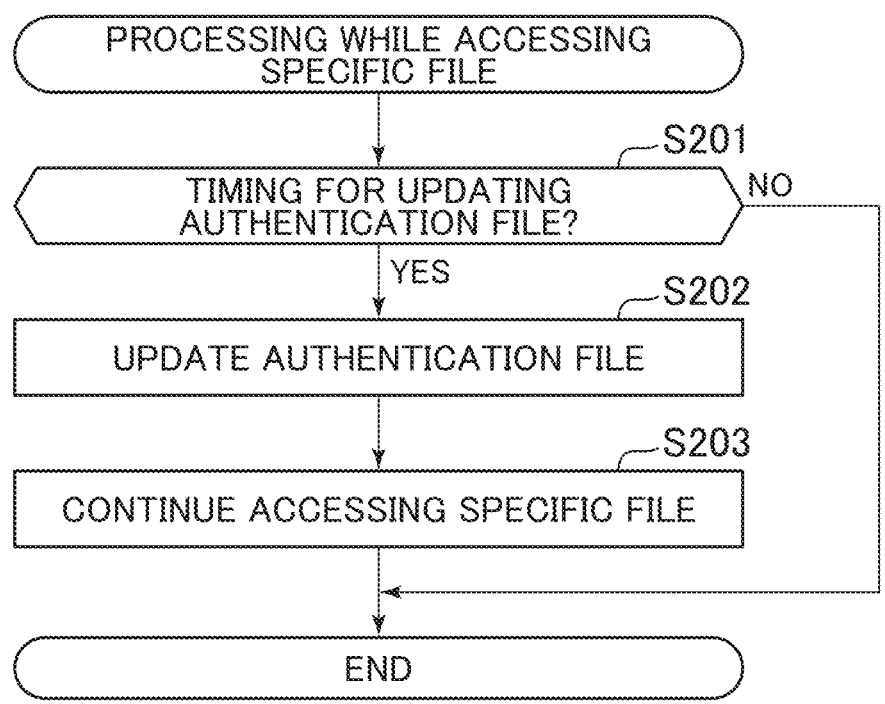
FIG. 4 is a diagram showing another example of the operation flow of the terminal.
Figure 5:
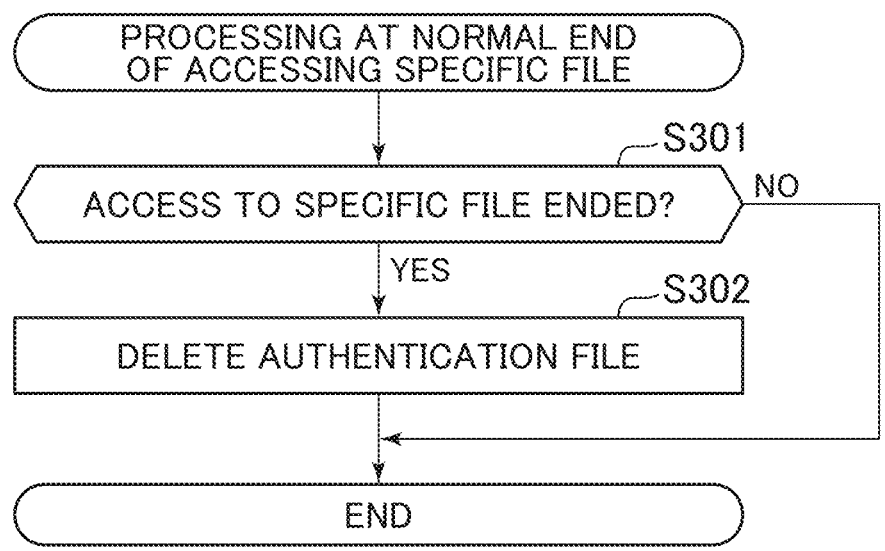
FIG. 5 is a diagram showing another example of the operation flow of the terminal.
Figure 6:
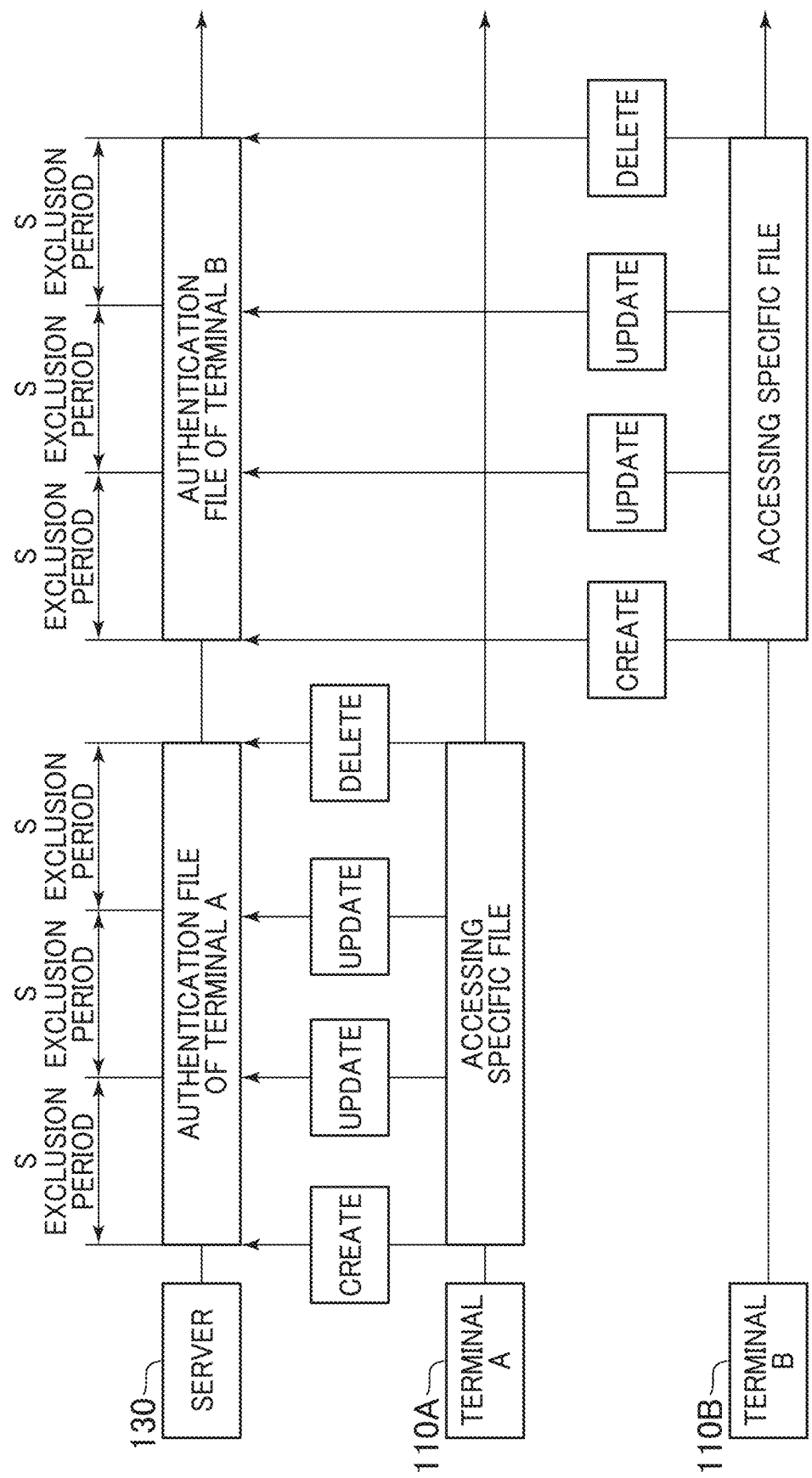
FIG. 6 is a diagram showing an example of an operation sequence in an exclusive control method according to a preferred embodiment of the present invention.
Figure 7:
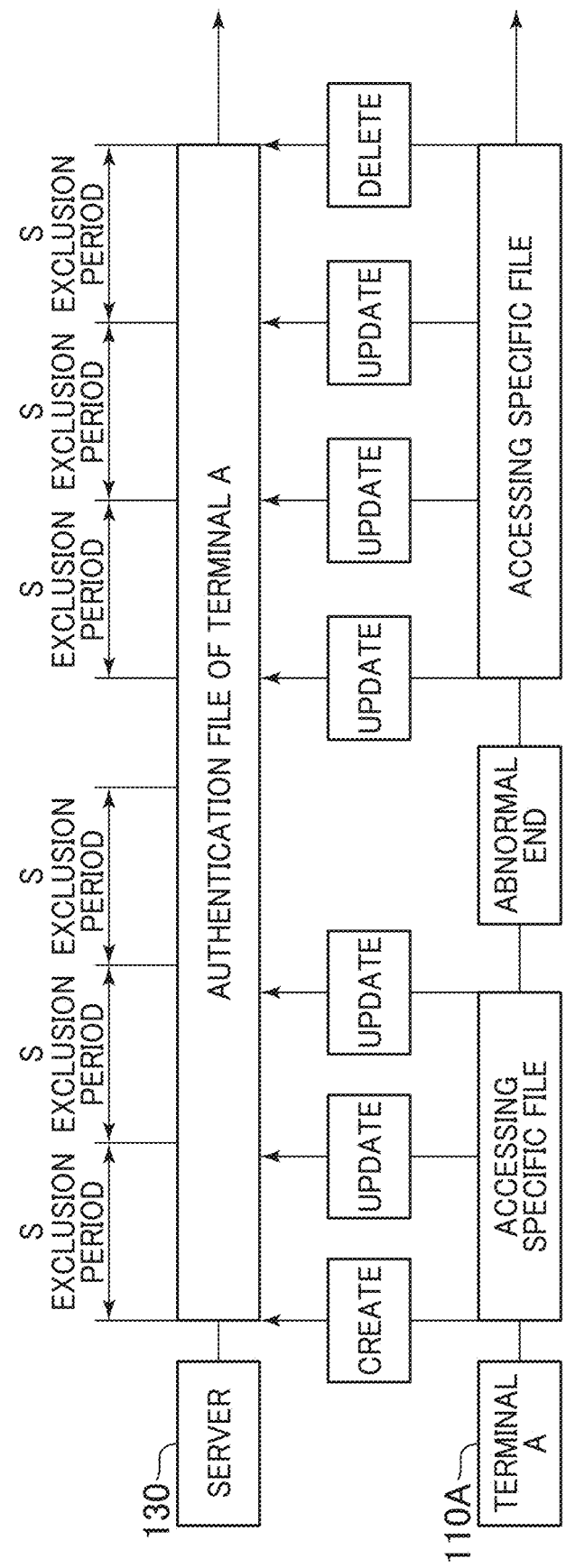
FIG. 7 is a diagram showing another example of the operation sequence.

FIGS. 3 to 5 show examples of operation flows of the terminal 110. First, an operation performed when the terminal 110 begins accessing the specific file SF is described, with reference to the operation flow shown in FIG. 3. In the description of this operation flow, reference will be made to FIGS. 1 2. Reference will be made to the operation sequences shown in FIGS. 6 to 9 when the operation flows of FIGS. 3 5 are described.

Upon receiving a user input which provides an instruction to start accessing the specific file SF, the specific file processor 113 of the terminal 110 transmits data notifying the access of the specific file SF to the determiner 112. Upon receiving the data transmitted from the specific file processor 113, the determiner 112 of the terminal 110 determines if an authentication file AF is stored in the predetermined memory storage region of the memory storage of the server 130 (Step S101). For example, the determiner 112 may determine if an authentication file AF is stored by accessing the predetermined memory storage region in the memory storage of the server 130 to confirm if an authentication file AF is stored in the memory storage of the server 130.

If an authentication file AF is not stored (Step S101; No), the determiner 112 transmits data notifying that the authentication file AF is not stored to the process executor 111. Upon receiving the data transmitted from the determiner 112, the process executor 111 of the terminal 110 (a terminal A in FIG. 6) creates an authentication file AF in the predetermined memory storage region in the memory storage of the server 130 as shown in the operation sequence of FIG. 6 (Step S102). That is, the process executor 111 sets an access right to define a valid period (an exclusion period S) in the server 130. For example, the process executor 111, as an authentication file AF, creates a file which records address data indicating the IP (Internet Protocol) address of the first terminal, time data related to the time at which the authentication file AF was created (the start time of the authentication file AF), and period data related to the valid period (that is, the exclusion period S) of the authentication file AF. The process executor 111 transmits to the specific file processor 113 data notifying that the authentication file AF has been created.

Upon receiving the data transmitted from the process executor 111, the specific file processor 113 begins accessing the specific file SF (Step S103). As described above, the terminal 110 is able to begin accessing the specific file SF if the authentication file AF is not stored in the predetermined memory storage region in the memory storage of the server 130 when beginning to access the specific file SF.

The operations described above are a situation where, as viewed from the first terminal (for example, the terminal A in FIG. 6), after access from a second terminal (for example, the terminal B in FIG. 6) to the specific file SF has ended normally (a situation where the second terminal has deleted the authentication file AF after accessing the specific file SF), or a situation where the valid period (the exclusion period S) of the authentication file AF has elapsed after the access from a second terminal (for example, the terminal B in FIG. 6) to the specific file SF ended abnormally. In the latter situation, the authentication file AF remains on the server 130. However, another terminal 110 is able to newly create an authentication file AF on the server 130. Accordingly, the another terminal 110 may delete (or may overwrite) the previous invalid authentication file AF when creating an authentication file AF, or the server 130 may delete the invalid authentication file AF after a predetermined period of time has lapsed. Even in a situation where, as viewed from a second terminal, i.e., another terminal (for example, the terminal B in FIG. 6), after access from the first terminal (for example, the terminal A in FIG. 6) to the specific file SF has ended normally, or a situation where the valid period (the exclusion period S) of the authentication file AF has elapsed after the access from the first terminal (for example, the terminal A in FIG. 6) to the specific file SF ended abnormally, a second terminal, i.e., another terminal (for example, the terminal B in FIG. 6) is able to begin accessing the specific file SF by a process similar to the process described above.

In Step S101, if the authentication file AF is stored (Step S101; Yes), the determiner 112 determines if the authentication file AF is an authentication file for the first terminal (Step S104). The determiner 112 may, by referring to, for example, to the address data recorded in the authentication file AF and confirming if the address data is the IP address of the first terminal, determine if the authentication file AF is an authentication file AF for the first terminal.

If the authentication file AF is an authentication file AF for the first terminal (Step S104; Yes), the determiner 112 transmits data notifying that the authentication file AF is for the first terminal to the process executor 111. As shown in the operation sequence of FIG. 7, upon receiving the data transmitted from the determiner 112, the process executor 111 updates the authentication file AF stored in the memory storage region in the memory storage of the server 130 (Step S105). In Step S105, the process executor 111 may create a new authentication file AF and may overwrite the previous authentication file AF. The process executor 111 updates the start time data recorded in the authentication file AF with a new start time.

The process executor 111 updates the period data recorded in the authentication file AF. The process executor 111 may update the period data when the period data recorded in the authentication file AF causes a change in the valid period (the exclusion period S) of the authentication file AF. The process executor 111 transmits to the specific file processor 113 data notifying that the authentication file AF has been updated. Next, upon receiving the data transmitted from the process executor 111, the specific file processor 113 starts accessing the specific file SF (Step S103).

As described above, it is possible to start accessing the specific file SF if the authentication file AF for the first terminal (the terminal A in FIG. 7) is stored in the predetermined memory storage region in the memory storage of the server 130 when beginning accessing of the specific file SF. The operations described above involve a situation where, as shown in FIG. 7, while the specific file SF was being processed by the first terminal (the terminal A in FIG. 7), the processing ended abnormally and the authentication file AF remained, however, after the valid period has lapsed, no access has been performed to the specific file SF by a second terminal (for example, the terminal B in FIG. 6).

In Step S104, if the authentication file AF is not an authentication file AF for the first terminal (Step S104; No), the determiner 112 determines if the authentication file AF is valid (if the authentication file AF is within the exclusion period S) (Step S106). The determiner 112 refers to the start time data and the period data recorded in the authentication file AF, and the valid period which is able to be specified by the start time data or the valid period which is able to be specified by the period data is confirmed, to determine if the authentication file AF is valid (if the authentication file is within the exclusion period S).

If the determiner 112 determines the authentication file AF as being valid (as being within the exclusion period S) (Step S106; Yes), the determiner 112 transmits data notifying that the authentication file AF is valid to the specific file processor 113. If the specific file processor 113 receives the data transmitted from the determiner 112, the specific file processor 113 determines access to the specific file SF as being restricted and ends the processing without beginning to access the specific file SF (for example, the terminal B in FIG. 8). At this time, the specific file processor 113 may notify the user of the first terminal (for example, the terminal B in FIG. 8) not to access the specific file SF (or that access to the specific file SF is restricted).

Figure 8:
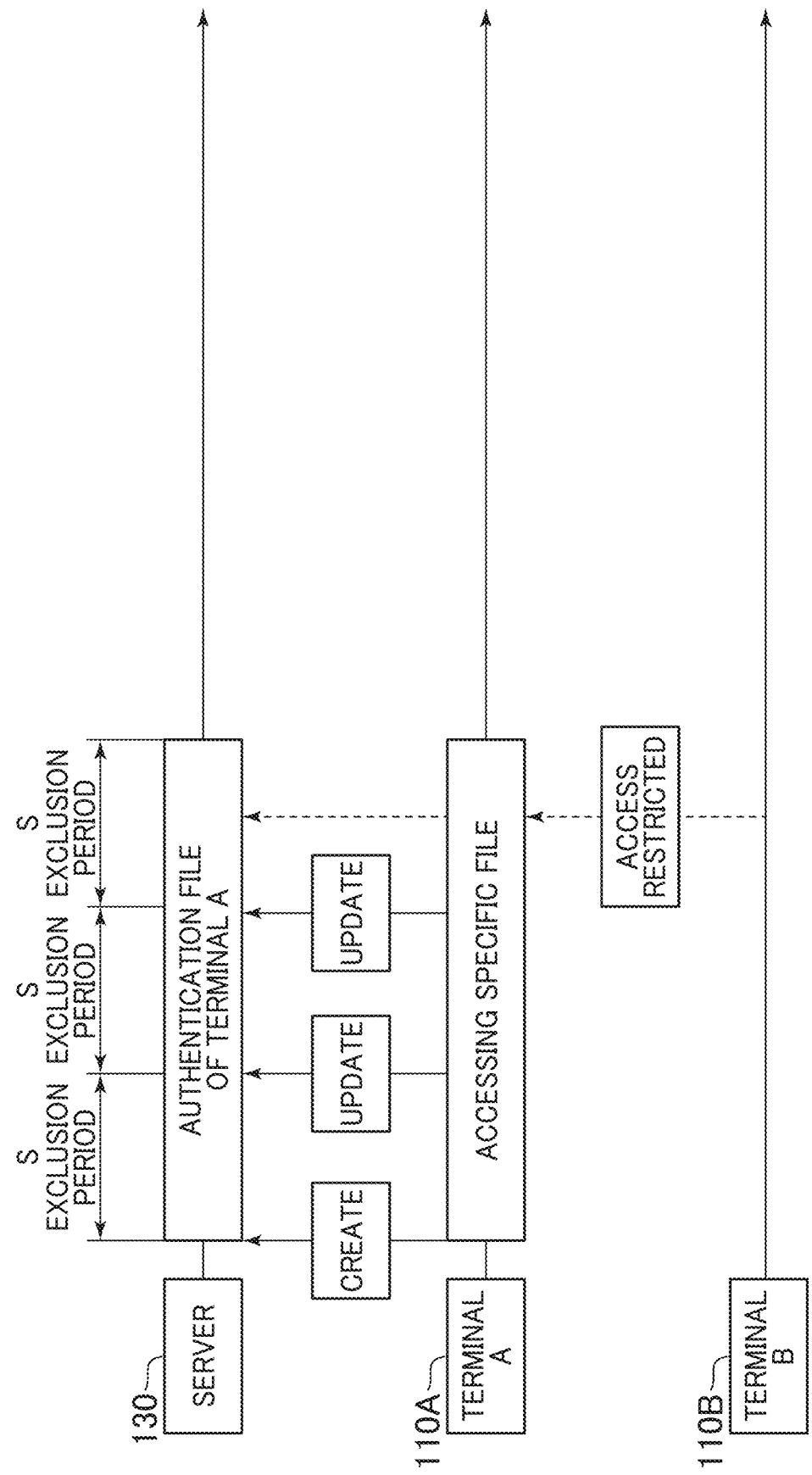
FIG. 8 is a diagram showing another example of the operation sequence.

As described above, if an authentication file AF identified as created by a second terminal, i.e., another terminal (the terminal A in FIG. 8) is stored in the predetermined memory storage region of the memory storage of the server 130 and if the authentication file AF is valid (is within the exclusion period S), the first terminal (for example, the terminal B in FIG. 8) determines access to the specific file SF as being restricted. The operation sequence of FIG. 8 shows a case where the second terminal, i.e., another terminal (the terminal A in FIG. 8) continues to access the specific file SF, and access of the first terminal (for example, the terminal B in FIG. 8) to the specific file SF is restricted.

In Step S106, if it is not within the exclusion period S, that is, if a valid authentication file AF created by the second terminal, i.e., another terminal 110 is not present (Step S106; No), the determiner 112 transmits data notifying to the process executor 111 that it is not within the exclusion period S. Upon receiving the data transmitted from the determiner 112, the process executor 111 deletes the authentication file AF stored in the memory storage region in the memory storage of the server 130 (Step S107) and creates a new authentication file AF in the memory storage region as shown in the operation sequence of FIG. 9 (Step S102). That is, the process executor 111 sets an access right to define a valid period (an exclusion period S) in the server 130. In Step S107, the process executor 111 may update the previous authentication file AF with a new authentication file AF or may update the previous authentication file AF. In Step S107, the process executor 111 may create a new authentication file AF by Step S102 while leaving the invalid authentication file AF to remain in Step S107. Next, the process executor 111 transmits to the specific file processor 113 data notifying that an authentication file AF has been created. Upon receiving the data transmitted from the process executor 111, the specific file processor 113 starts accessing the specific file SF (Step S103).

Figure 9:
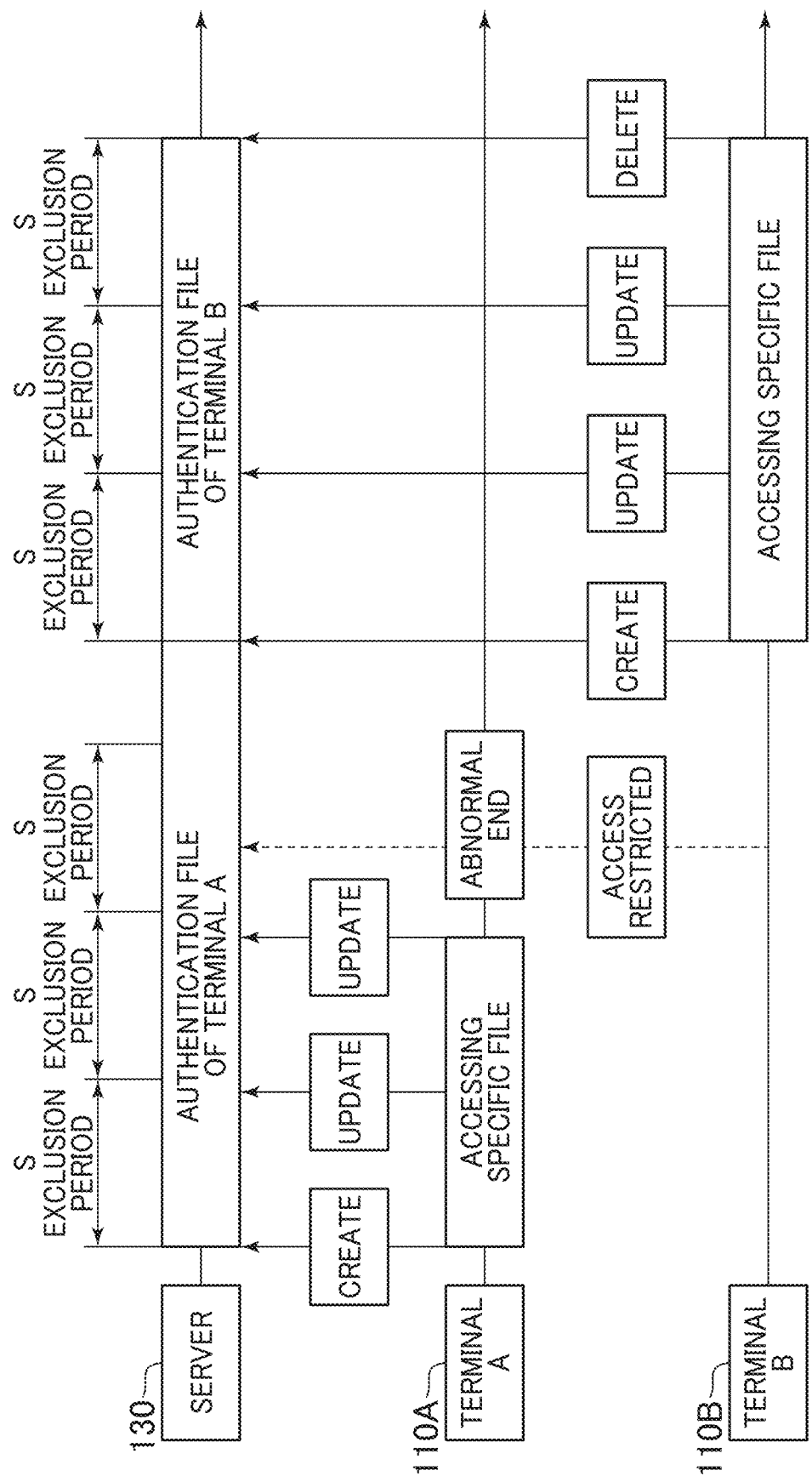
FIG. 9 is a diagram showing another example of the operation sequence.

As described above, even if, when starting accessing the specific file SF, an authentication file AF created by the second terminal, i.e., another terminal (for example, the terminal A in FIG. 9) is stored in the predetermined memory storage region of the memory storage of the server 130, as long as the authentication file AF is identified as being invalid (as not being within the exclusion period S), the terminal 110 (for example, the terminal B in FIG. 9) determines access to the specific file SF as not being restricted and can start accessing the specific file SF. This type of situation is a situation where, as shown in FIG. 9, after the processing of the second terminal, i.e., another terminal (for example, the terminal A in FIG. 9) on the specific file SF has ended abnormally. Next, an operation performed while the terminal 110 is accessing the specific file SF is described, with reference to the operation flow shown in FIG. 4. In the description of this operation flow, reference will be made to FIGS. 1 to 3. As with the description above, reference will be made to the operation sequences shown in FIGS. 6 to 9. As shown in the operation sequences of FIGS. 6 to 9, after an authentication file AF has been created or the authentication file AF has been updated, the process executor 111 of the terminal 110 determines if a timing is a timing at which the authentication file AF is to be updated (Step S201).

After receiving from the process executor 111 data notifying that an authentication file AF has been created or that the authentication file AF has been updated, before the preliminarily set valid period of the authentication file AF lapses, if the specific file SF is being accessed, the specific file processor 113 of the terminal 110 transmits data notifying that the specific file SF is being accessed to the process executor 111. For example, if the processing of viewing the specific file SF is continuing normally, if the processing of acquiring the specific file SF from the server 130 is continuing normally, or if the processing of editing the specific file SF is continuing normally, the specific file processor 113 may determine the specific file SF as being accessed. The timing at which the authentication file AF is to be updated may be a timing immediately before the valid period of the authentication file AF lapses, or a timing before a predetermined period lapses since the valid period has elapsed. The predetermined period can be set arbitrarily and may be set preliminarily. The specific file processor 113 updates the authentication file AF every time an update period shorter than the valid period of the authentication file AF lapses. Upon receiving the data transmitted from the specific file processor 111, the process executor 113 determines that the timing is the timing for updating the authentication file AF.

If the timing is the timing for updating the authentication file AF (Step S201; Yes), the process executor 111 updates the authentication file AF stored in the predetermined memory storage region of the memory storage of the server 130 (Step S202). In Step S202, as the processing of updating the authentication file AF, the process executor 111 may overwrite the authentication file AF described above with a new authentication file AF. Next, the process executor 111 transmits to the specific file processor 113 data notifying that the authentication file AF has been updated. When the data transmitted from the process executor 111 is received, the specific file processor 113 continues to access the specific file SF (Step S103).

As described above, if the terminal 110 is accessing the specific file SF, the terminal 110 updates (overwrites) the authentication file AF and can continue to access the specific file SF. Meanwhile, the authentication file AF continues to be valid (the exclusion period S is extended) as the authentication file AF is updated by the first terminal, and accordingly, access of the second terminal 110 to the specific file SF continues to be restricted.

In Step S201, if the timing is determined as not being a timing for updating the authentication file AF (Step S201; No), as shown in the operation sequence of FIG. 6, the process executor 111 ends the processing without updating the authentication file AF stored in the predetermined memory storage region of the memory storage of the server 130. Here, the cases where the timing is determined as not being a timing for updating the authentication file AF fall into two cases, in particular, a first case where the timing is determined as not being a timing for updating because it is actually not a timing for updating and a second case where the timing is determined as not being a timing for updating because whether or not the specific file SF is being accessed is unknown while it is actually a timing for updating.

Examples of possible situations which fall into the second case include a situation where connection to the server 130 ended abnormally while being connected to the server 130, a situation where the processing of viewing the specific file SF ended abnormally, a situation where the processing of acquiring the specific file SF from the server 130 ended abnormally, and a situation where the processing editing the specific file SF ended abnormally. In the situations described above, the process executor 111 is not able to receive from the specific file processor 113 data notifying that the specific file SF is being accessed and thus determines that the timing is not a timing for updating the authentication file.

Thus, the terminal 110 is not able to update the authentication file AF if the connection of the terminal 110 to the server 130 ends abnormally while being connected to the server 130 or if the processing on the specific file SF ends abnormally while the processing is being performed. Meanwhile, the authentication file AF is not updated (updated), and accordingly, the authentication file AF becomes invalid after the valid period has elapsed (the exclusion period S has elapsed). As a result, another terminal 110 will be able to start accessing the specific file SF.

Next, an operation performed when the terminal 110 normally ends accessing the specific file SF is described, with reference to the operation flow shown in FIG. 5. In the description of this operation flow, reference will be made to FIGS. 1 to 4. As with the description above, reference will be made to the operation sequences shown in FIGS. 6 to 9. The specific file processor 113 of the terminal 110 determines if access to the specific file processor SF has ended (Step S301). If the processing of viewing the specific file SF has ended normally, if the processing of acquiring the specific file SF from the server 130 has ended normally, or if the processing of editing the specific file SF has ended normally, the specific file processor 113 determines access to the specific file SF as having ended.

If access to the specific file SF has ended (Step S301; Yes), the specific file processor 113 transmits data notifying that access to the specific file SF has ended to the process executor 111. Upon receiving the data transmitted from the specific file processor 113, the process executor 111 of the terminal 110 deletes the authentication file AF stored in the predetermined memory storage region in the memory storage of the server 130 as shown in the operation sequence of FIG. 6 (Step S302) and ends the processing. As described above, the terminal 110 (the first terminal or the terminal A in FIG. 6) deletes the authentication file AF when ending the access to the specific file SF normally. Meanwhile, since the authentication file AF has been deleted, a second terminal, i.e., another terminal (for example, the terminal B in FIG. 6) can start accessing the specific file SF as shown in the operation sequence of FIG. 6.

In Step S301, if the access to the specific file SF has not ended (Step S301; No), the specific file processor 113 ends the processing without transmitting data notifying that the access to the specific file SF has not ended to the process executor 111. As described above, the terminal 110 does not delete the authentication file AF if the access to the specific file SF has not ended. Meanwhile, since the valid authentication file AF is not deleted, until the valid period lapses (until the exclusion period S lapses), the other terminal 110 determines access to the specific file SF as being restricted and does not start accessing the specific file SF (see the operation sequence in FIG. 8 or FIG. 9).

As described above, according to the present preferred embodiment, when the first terminal is accessing (or is allowed to access) the specific file SF, the first terminal continues to update the authentication file AF until the valid period lapses (until the exclusion period S lapses) to prevent other terminals from accessing the specific file SF, thus providing the exclusion control. Meanwhile, even if the connection of the first terminal to the server 130 ends abnormally, or even if the first terminal abnormally ends the access to the specific file SF, the elapsed valid period of the authentication file AF (the elapsed exclusion period S) provides access from a second terminal, i.e., another terminal to the specific file SF, thus preventing the access from the second terminal, i.e., another terminal to the specific file SF from becoming impossible. As described above, in the present preferred embodiment, the exclusive control is completed by processing of the terminal 110 in which whether or not access to the specific file SF is possible is determined by confirming whether or not the authentication file AF created by another terminal 110 is valid according to operations performed by the determiner 112 of each terminal 110. Therefore, a program for the exclusive control is not required to be implemented by the server 130.

In the preferred embodiment described above, when updating the authentication file AF, the process executor 111 of the terminal 110 updates, of the data recorded in the authentication file AF, period data related to the valid period (the exclusion period S). However, the process executor 111 is not limited to this mode, and the process executor 111 may, as the processing of updating the authentication file AF, overwrite the authentication file AF at constant or substantially constant intervals.

To notify that access to the specific file SF is being performed (or being permitted), the process executor 111 of the terminal 110 may repeatedly transmit a special packet to the server 130 as the updating processing. Accordingly, the determiner 112 of the terminal 110 may refer to a communication history (for example, a communication log) of the server 130 and may determine access to the specific file SF as being restricted if a preliminarily set exclusion period S has not elapsed since the server 130 received the special packet from another terminal 110, or may determine access to the specific file SF as not being restricted if the exclusion period S has elapsed since the server 130 received the special packet from another terminal 110. In the operations described above, the exclusion period S is preliminarily set as a common period in the exclusive control system 100.

To notify that access to the specific file SF is being performed (or being permitted), the process executor 111 of the terminal 110 may repeatedly update the property of the specific file SF as the updating processing. Accordingly, the determiner 112 of the terminal 110 may determine access to the specific file SF as being restricted if the preliminarily set exclusion period S has not elapsed since another terminal 110 last updated the property of the specific file SF and may determine access to the specific file SF as not being restricted if the exclusion period S has elapsed since another terminal 110 last updated the property of the specific file SF.

For example, the process executor 111 may, when updating the property of the specific file SF, update a time attribute value in the property of the specific file SF related to the time at which the update is made, and the determiner 112 may determine if the exclusion period S has elapsed based on the attribute value of the time at which the update is made. Also, for example, the process executor 111 may, when updating the property of the specific file SF, update a period attribute value related to the exclusion period S included in the property of the specific file SF, and the determiner 112 may determine if the exclusion period S has elapsed based on the updated period attribute value.

Preferred embodiments of the present invention have been described above. However, the technical scope of the present invention is not limited to the description of the above preferred embodiments. Various modifications or improvements may be added to the above preferred embodiments by those skilled in the art. The technical scope of the present invention also encompasses one or more of such modifications or improvements. The order of executing processes shown in the preferred embodiments may be provided in an arbitrary order unless an output of the previous processing is used in the following processing. While operations in the above preferred embodiments have been described with expressions including, for example, "first", "next", and "subsequently" for the sake of convenience, the operations need not always be implemented in that order.

In the preferred embodiments described above, the process executor 111, the determiner 112, and the specific file processor 113 of the terminal 110 may be implemented by software and hardware that cooperate with each other by reading a program on a computer. Furthermore, the contents of Japanese Patent Application No. 2018-080698 and all documents cited in the detailed description of the present invention are incorporated herein by reference to the extent permitted by law.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An exclusive control system comprising:
   a plurality of terminals and a server storing, in a memory storage of the server, predetermined data which is able to be accessed by each of the plurality of terminals, the exclusive control system restricting simultaneous access from the plurality of terminals to the predetermined data, wherein
   each of the plurality of terminals includes a process executor and a determiner,
   the process executor is configured or programmed to:
      create and store, in the memory storage of the server, an access right to define an exclusion period during which a first terminal is able to access the predetermined data while access thereto by a second terminal is restricted, and
      if a predetermined timing before lapse of the exclusion period has occurred during access of the first terminal to the predetermined data, repeatedly execute an updating process to update the exclusion period before the exclusion period lapses; and
   the determiner is configured or programmed to determine access to the predetermined data as being restricted if within the exclusion period defined by the second terminal, and to determine access to the predetermined data as being not restricted if outside the exclusion period.

2. The exclusive control system according to claim 1, wherein the process executor is configured or programmed to, when accessing the predetermined data, create and store in the memory storage of the server an authentication file having a valid period which is the exclusion period and, if the predetermined timing before lapse of the valid period has occurred during access of the first terminal to the predetermined data, repeatedly execute an updating process to update the authentication file, and the determiner is configured or programmed to determine access to the predetermined data as being restricted if the authentication file created on the server by the second terminal is within the valid period, and to determine access to the predetermined data as being not restricted if the authentication file created by the second terminal is not present on the server or if the valid period of the authentication file created on the server by the second terminal has elapsed.

3. The exclusive control system according to claim 1, wherein the memory storage of the server stores a file in which, as the predetermined data, there is recorded map data indicating a track to transport an article by a transport vehicle and a delivery destination of the article.

4. An exclusive control method comprising:
a plurality of terminals and a server storing, in a memory storage region of the server, predetermined data which is able to be accessed by each of the plurality of terminals, the exclusive control method restricting simultaneous access from the plurality of terminals to the predetermined data, wherein each of the plurality of terminals performs:
creating and storing, in the memory storage of the server, an access right to define an exclusion period during which a first terminal is able to access the predetermined data while access thereto by a second terminal is restricted and, if a predetermined timing before lapse of the exclusion period has occurred during access of the first terminal to the predetermined data, repeatedly executing an updating process to update the exclusion period before the exclusion period elapses; and determining access to the predetermined data as being restricted if within the exclusion period defined by the second terminal, and determining access to the predetermined data as being not restricted if outside the exclusion period.

* * * * *